March 24, 1970     R. U. SCHENK     3,502,458
METHOD OF MAKING A SLOW RELEASE FERTILIZER
Filed Feb. 28, 1967     5 Sheets-Sheet 1

INVENTOR
ROY U. SCHENK

March 24, 1970 R. U. SCHENK 3,502,458
METHOD OF MAKING A SLOW RELEASE FERTILIZER
Filed Feb. 28, 1967 5 Sheets-Sheet 3

INVENTOR
ROY U. SCHENK

March 24, 1970        R. U. SCHENK        3,502,458

METHOD OF MAKING A SLOW RELEASE FERTILIZER

Filed Feb. 28, 1967        5 Sheets-Sheet 4

INVENTOR
ROY U. SCHENK

March 24, 1970 R. U. SCHENK 3,502,458
METHOD OF MAKING A SLOW RELEASE FERTILIZER
Filed Feb. 28, 1967 5 Sheets-Sheet 5

INVENTOR.
ROY U. SCHENK

United States Patent Office 3,502,458
Patented Mar. 24, 1970

3,502,458
METHOD OF MAKING A SLOW RELEASE FERTILIZER
Roy U. Schenk, Cincinnati, Ohio
(411 S. Brooks St., Madison, Wis. 53715)
Continuation-in-part of application Ser. No. 560,945,
June 16, 1966. This application Feb. 28, 1967, Ser.
No. 632,865
Int. Cl. A01g 29/00; C05
U.S. Cl. 71—64    7 Claims

ABSTRACT OF THE DISCLOSURE

A method of producing a slow release prolonged duration fertilizer. A dry fibrous organic material, a dry fertilizing material, and a bonding agent are mixed in the proportions of at least 10% organic material and at least 3% binder. The mixture is then heated to a temperature up to 380° F. at a pressure between 100–8000 p.s.i. The product formed is a rigid mass.

---

This application is a continutation-in-part of co-pending application now abandoned, Ser. No. 560,945, filed June 16, 1966.

This invention relates to a fertilizer product useful for fertilizing perrenials and other plants over an extended period of time, and particularly to a new simple, inexpensive and highly effective method for making such a product.

The need for prolonged release of applied fertilizers has long been recognized, and a number of solutions to this problem have been proposed. One recently developed solution is through the coating of pelleted or granular fertilizers with a water insoluble substance. Examples of this include urea-formaldehyde (Smith, 3,150,955), wax (Zaayenga, 3,192,031 and others), and a number of other organic resins (Hansen, 3,259,482; 3,264,088; 3,264,089). Pole (2,806,773) used silicates and water insoluble organic resins to coat minor element particles and adhere them to inert carriers to produce slow release granules. Most of these products do slow the rate of release, but their action is apt to be highly variable.

Lehr (2,019,824) claimed to achieve a measure of prolonged release in his rather porous product by the incorporation of a special "water resisting peat." The product was formed by compressing a mixture of peat and fertilizer at 130–150 kg./cm.² without heating. Another method for achieving prolonged fertilization involved the enclosing of soluble fertilizers in water impervious bags containing a number of small holes (Attoe, 3,059,379). This appears to achieve a significant slowing of nutrient release, but the release rate may vary excessively with the soil moisture conditions.

The encasing of fertilizers in cartridges or shells composed of slowly decomposable materials is also used to obtain prolonged fertilization. The slow release properties of the elaborate cartridge of Pavek (3,060,012) depend primarily on the gradual decomposition of a series of concentric rings; though he does suggest the possibility of including sawdust, corncobs or other organic materials as well as the mixing in of waterproofing chemicals to slow the rate of release. It is not clear that he intended to bind these components into a solid mass as he mentions only sawdust as a binder (column 3, line 18), and lists glue, casein, and others as "moisture proofing chemicals" (column 3, lines 60–61). Although this cartridge takes the shape of a stake, no suggestion is made that it can be driven into the ground.

The cartridge of Laffler et al. (2,931,140) depends on the slow diffusion of the fertilizer nutrients in aqueous solution through small holes in its nose cone. This elaborate cartridge assumes a stake form and is designed to be driven into the ground.

The fertilizer stake of Antrim (2,032,608) offers a limited regulation of fertilizer release. This stake is formed by compressing a mixture of cellular fibrous material, and a binder with a large amount of water, plus fertilizer as an optional component. This composite cannot be compressed excessively or a portion of the moisture is pressed out, carrying along a portion of the fertilizing ingredients. The fertilizer content of this stake is quite low, and the stake is designed to disintegrate rapidly when placed in moist soil, thus giving a relatively short period of release.

The fertilizer sticks of Gessler (3,057,713) are principally phosphate fertilizers since they are essentially formed from a mixture of super-phosphate fertilizer, asbestos and phosphoric acid together with a substantial amount of water, with other fertilizer nutrients as optional ingredients. After its formation, the stick or cone is allowed to air dry slowly, during which time it develops a hard outer shell claimed to be strong enough to permit the stick to be driven into the ground. A reaction between the asbestos and the phosphoric acid or more likely [$Ca(H_2PO_4)_2$] evidently produces this strong surface layer through formation of a hard fibrous binder—a reaction reminiscent of the setting of concrete. Like concrete, the stakes are rather brittle and tend to shatter as they are being driven into the ground.

Both the Antrim and the Gessler products have water contents so high as to limit their compression during shaping. If an excessive pressure is applied, water is pressed out, carrying along a portion of the fertilizing ingredients. Also the relatively high cohesive strength of these products is imparted primarily during the drying operation rather than during the compression. The migration of water toward the exterior surfaces of these products during drying undoubtedly carries along a substantial portion of the soluble plant nutrients, thus reducing the slow release characteristics of these products.

It is obvious from the above discussion that in no instance, except possibly with the plastic bags of Attoe, has a simple, inexpensive method been developed to produce a fertilizer product whose rate of nutrient release is readily controllable.

The present invention involves a slow release fertilizer which is simple and inexpensive to manufacture and in which the rate of nutrient release can be regulated during the manufacturing process. The product is formed essentially from a mixture composed of a fibrous organic material, a binder and a fertilizer, and contains a low moisture content. The mixture is placed under pressure and temperature at least adequate for activating the binder whereby the mixture is bound together into a unitary mass with the desired level of porosity and has substantial cohesive strength when cooled and removed from the press. A careful control of the moisture content of the mixture during compression adds a further level of a control of the compressibility an consequent porosity of the product.

As can be seen from this description, this product can be formed very rapidly, simply and inexpensively since its binding is completed when the product is released from the compressing device. It has essentially no water loss and hence no loss of soluble nutrients during compression and little or no migration of water soluble nutrients toward the surface subsequently.

When the binder of this product is water insoluble, the rate of nutrient release in moist soil is believed related to the porosity of the product. This porosity is primarily dependent on the conditions of formation, as will be shown later, being inversely related to the pressure, temperature and moisture content during the compressive binding.

To illustrate the effects of differences in porosity, two cylindrical forms of the product with identical composition and comparable binding temperatures, but compressed at 200 p.s.i. and 5,000 p.s.i. respectively, were dipped repeatedly into containers of water at the rate of 200 cycles per hour, after which the water was filtered and evaporated to determine the residual weight of extracted material. At the end of 500 cycles, the low pressure product had lost 34 percent of its fertilizer weight whereas the high pressure product had lost only 8.5 percent. At the end of 2,500 cycles, the low pressure product had lost 71 percent of its fertilizer weight, whereas the high pressure product had lost only 35 percent. Moreover, examination showed that the soluble portion of the fertilizer had been extracted from throughout the low pressure product but only from the outer layers of the high pressure product, leaving an essentially unchanged core.

In use, the product is quite durable for ease of handling and can be molded into almost any shape. For example, a rectangular block might be formed for insertion into the ground below or beside a tree seedling to supply a slow nutrient release for several years. This could be particularly useful for trees planted in relatively inaccessible locations such as coal strip mines.

In addition to the control of nutrient release achieved through the application of selected moisture, temperature and pressure during formation, a further measure of control can be achieved through regulation of the size and shape of the product. Thus a cube shaped product would yield a slower release than a comparable rectangular product of the same mass. Likewise one larger cube would yield a slower release than two or more smaller cubes with the same total mass.

Another method for regulating the rate of release is by controlling the amount of binder used, since increased binder composition should reduce porosity and thus slow nutrient release. Also selection of binders with variable degrees of water insolubility and microbial decomposability will permit at least a limited control of the rate of disintegration of the structural integrity of the product and thus of the rate of nutrient release.

Precoating the binder onto the fibrous organic matter before mixing with the fertilizer may also permit a limited increase in nutrient release rate since less of the binder would coat the fertilizer component.

Alternately, reductions in the rate of nutrient release from the product may be achievable by coating the fertilizer component with a water insoluble film, or by covering at least a portion of the exterior of the product with a water insoluble film or cover. For example, alternating strips of coated and uncoated surfaces might be used.

It is therefore an object of this invention to describe a slow release fertilizer which is simple and inexpensive to manufacture and in which the subsequent rate of nutrient release can be regulated during its manufacture.

It is a further object of this invention to describe the method of formation of a slow release fertilizer whose rate of nutrient release when placed in moist soil can readily be regulated during its manufacture.

Another object of this invention is the production of a slow release fertilizer product composed essentially of a fibrous organic material, a binder and a fertilizing substance wherein the composite has a sufficiently low and controlled moisture content to permit it to be bound into a unitary mass with high cohesion while being subjected to a pressure and temperature selected to attain the desired rate of nutrient release when the product is subsequently placed in the soil.

Still another object of this invention is the production of a slow release fertilizer product which has a sufficiently low moisture content to permit its being subjected to a high pressure and temperature during formation without loss of moisture and the soluble fertilizer nutrients dissolved therein.

A further object of this invention is the production of a slow release fertilizer product which has a sufficiently low moisture content so that evaporative drying is minimal or absent following compression, thus avoiding the migration of moisture and soluble fertilizer nutrients toward the exterior surfaces of the product.

Another object, in a preferred embodiment, is the production of a slow release fertilizer in stake form which is inexpensive and simple to manufacture and which is capable of being driven into the ground.

The essential features of the product components and the features involved in the formation of the product and of a preferred embodiment described in the following discussion in which the figures described below are referred to in due course.

FIGURE 1 is a graph showing the effects of increasing pressure on the volume of two typical fibrous organic materials in air dry condition and of a mixture containing the same amount of each of these materials combined into a product containing a commercial granular fertilizer and a typical binder, Cumar V–3, in the proportions of 35 parts, 55 parts and 10 parts respectively. Since the volume is directly related to porosity, the graph shows a decreasing porosity with increasing pressure, as would be anticipated. The materials were compressed at ambient temperature, about 55° F.

FIGURE 2 is a graph showing the effects of increasing temperature on the volume of the fibrous organic material sawdust alone, and of sawdust with either or both of the other two intrinsic components of the product, when compressed at 2,000 p.s.i. In each sample, the graph is based on a weight of 35 grams of air dry sawdust, and, when present, of 55 grams of granular fertilizer and of 10 grams of the Cumar V–3 binder. Since the volume is directly related to porosity, the graph shows the decrease in porosity with increasing temperature.

FIGURE 3 is a graph showing the effects of different pressures on the volume change and thus on the porosity change with increasing temperatures of a product composed of air dry sawdust, commercial granular fertilizer and Cumar V–3 binder, based on concentrations of 35 grams, 55 grams and 10 grams respectively in the samples at 500 p.s.i. and 2,000 p.s.i.; and in concentrations of 40 gram, 40 grams and 20 grams respectively at 100 p.s.i.

Figure 1:
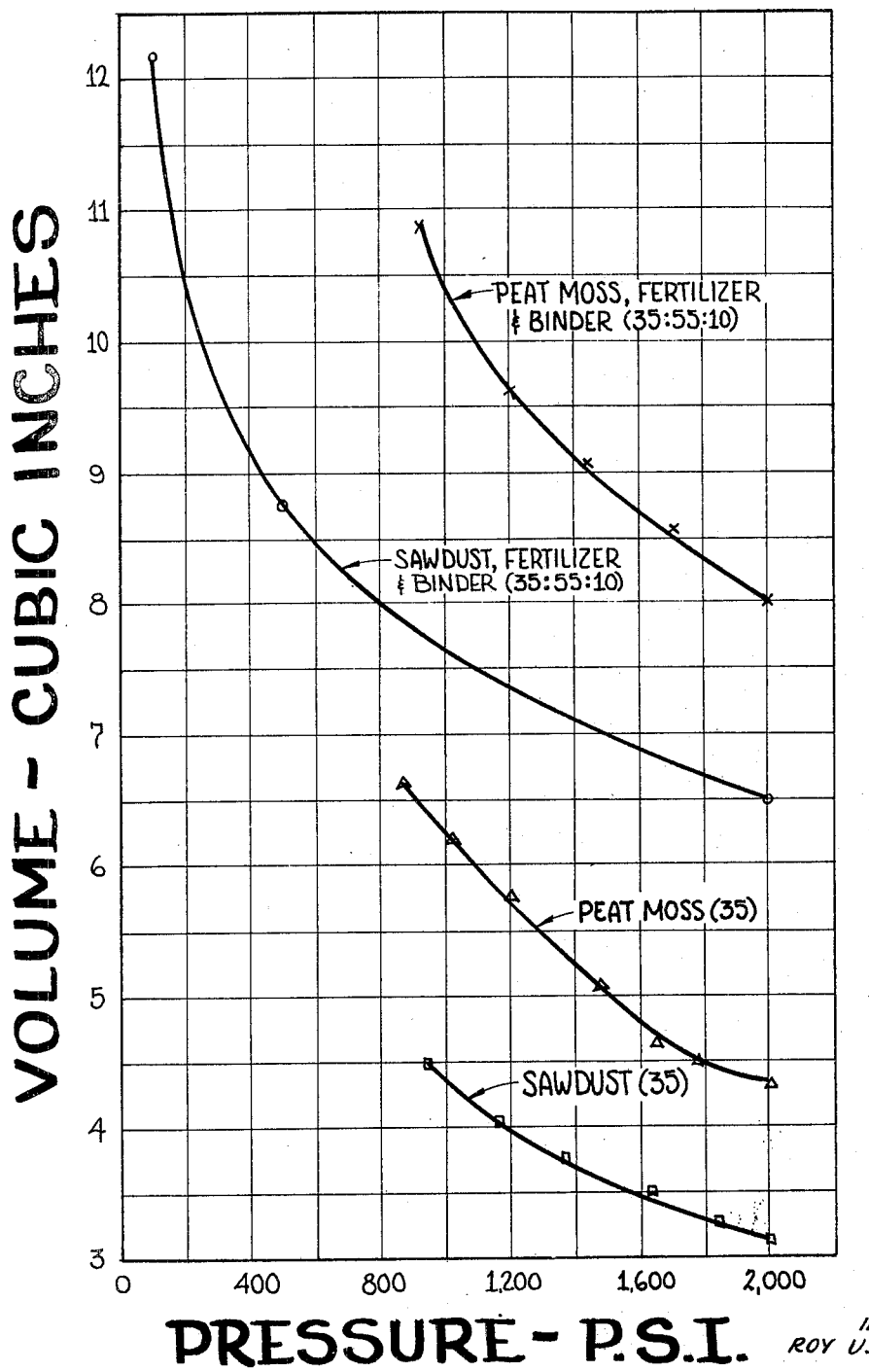

The essential components of this product are a fibrous organic material, a binder and a fertilizer substance. It is recognized that the essential features of more than one of these components may be found in one substance, as, for instance, in a fibrous organic material which has fertilizing properties, or a binder such as urea-formaldehyde which has fertilizing properties.

In theory, it appears that any binder can be used which will bind the composite at a high level of cohesion during or as a result of the forming and compressing operation. In practice, both thermoplastic and thermosetting binders have been used. A relatively low moisture content of the binder appears to be an important if not essential feature of the binder. A higher moisture content of the binder might be tolerated if the excess moisture were removed prior to compression of if the moisture could be removed as steam during compression. Alternately, of course, a binder dissolved in an organic solvent could be utilized so long as the fertilizer components are relatively insoluble in the solvent present during binding at a high level of cohesion is attained. This would appear likely to require removal of essentially all of the solvent before or during compression and heating.

Thermosetting binders which have been used include urea-formaldehyde and phenol-formaldehyde. Thermoplastic binders which have been used include Vinsol, a complex resin from pinewood which is marketed by Hercules Powder Company; Cumar V-3, which is a paracoumarone-indene resin marketed by Allied Chemical Company; and Eastobond M-2, which is a polyolefin resin marketed by Eastman Kodak Company.

There appears to be no practical limitation for a thermoplastic binder as long as it is activated for binding within a practical range of temperature and pressure. Thermosetting binders would be limited primarily by the practical consideration of the temperature and time required for their curing.

Binders have been incorporated at concentrations between 3 and 22 percent of total product weight, and the entire range appears likely to be useful in various applications. Indeed, the only limitations on the range of concentration of binder appear to be, at one extreme, the need for adequate binder to secure proper binding, and at the other extreme the need for adequate porosity of the product. Certain fibrous organic materials appear to contain a natural binder, or to form such a binder during compressive heating. For example, peat moss yielded a very well bonded product when subjected to a high pressure and temperature without added binder. Also, peat moss and fertilizer, when compressed at a high pressure and temperature without an added binder, produced a product which could be adequate for some applications, through it was not bonded tightly enough for all applications. However, a lower level of added binder would certainly be expected to achieve the requisite degree of binding for any application.

The fibrous organic materials which have been used include sawdust, peat moss, corn cobs and cloth linters. The concentrations tested vary from 10 to 100 percent with the most practical range appearing to be between 10 and 40 percent. The practical limitations of concentration appear to be the achievement of the necessary strength and reduced porosity at one extreme, and the undesirability of over-diluting the fertilizer component on the other. No theoretical barriers seem to limit the choice of fibrous organic matter to be used as long as the selected component can be admixed relatively evenly throughout the mass of the product.

The fertilizer component used primarily has been a granular, high analysis commercial fertilizer. Concentrations tested have ranged from 0 to 87 percent, with the most practical range for most applications appearing to be between 40 and 60 percent. The normal preference would appear to be the maximization of this component within the limitations of structural strength and reduced porosity desired for the product. No theoretical limitations appear to preclude the use of any other fertilizer source with a low moisture content or the incorporation of non-fertilizer components, such as growth hormones, weed killers or termite poisons to name just a few, as long as these components are not seriously decomposed or deleteriously affected by the conditions occurring during formation and subsequent storage of the product.

The pressures applied in formation of the product have ranged from 100 p.s.i. to, 8,000 p.s.i. While the most practical range for most applications appears to be between 500 and 2,00 p.s.i., no theoretical limitations appear to prevent the use of even lower or higher pressures than have been tested, so long as adequate binding is attained and porosity is not reduced excessively.

The volumes of typical fibrous organic materials and of mixtures of the essential components of the product are, of course, inversely related to the pressure applied, as shown in FIGURE 1; and since porosity is directly related to volume, porosity is reduced as the pressure is increased. The results presented in FIGURES 1 to 4 were obtained by placing the material or mixture to be studied into a cylinder with a one-inch cross-section and compressing it with a spring activated piston while heating as required. The pressures reported are those applied by the piston. The volume of the compressed rods formed are based on a total weight of 100 grams for the air dry composite or for a comparable proportion when only one or two components were compressed. In these comparative studies, Cumar V-3 resin was selected as a typical binder.

Figure 2:
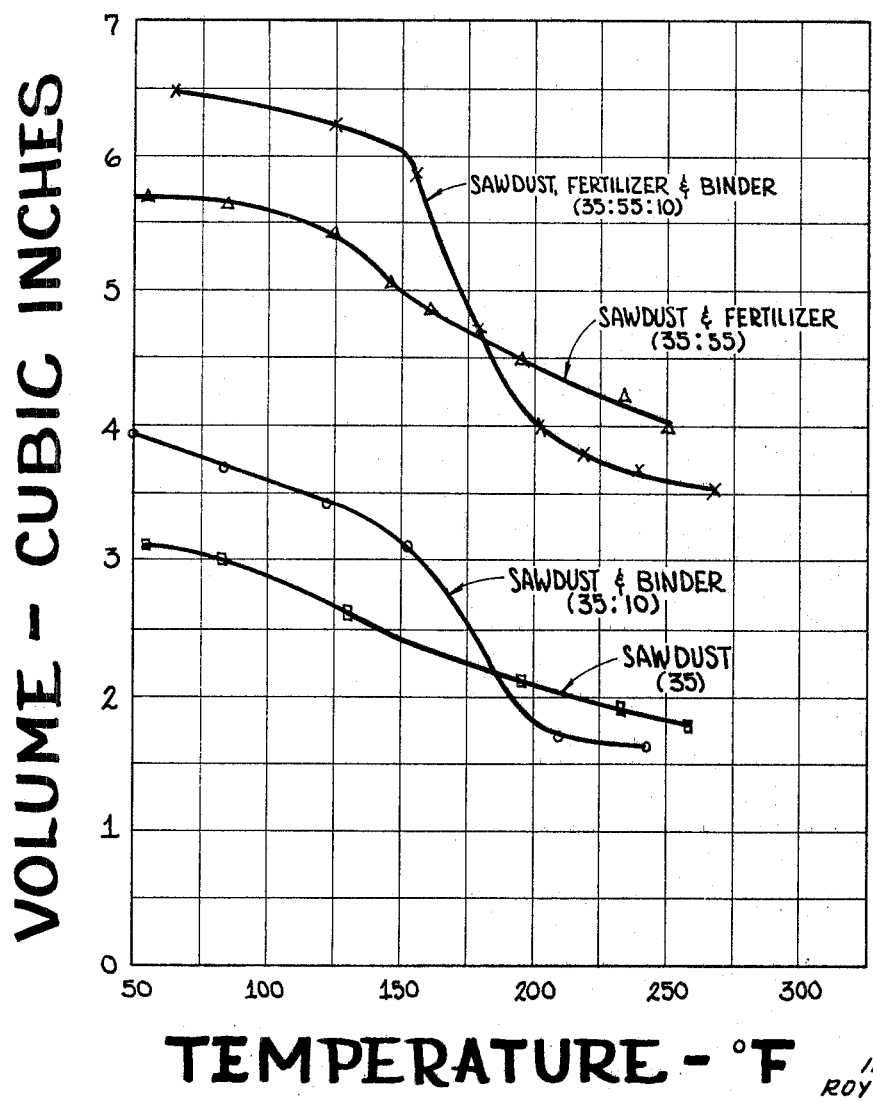

The temperatures applied during the binding operation have ranged from ambient temperature up to 380° F. In practice the lower temperature limit appears to be the minimum temperature at which a thermosetting resin will set within a reasonable time or at which a thermoplastic resin can be softened for binding. Thus it appears that activation of the binder involves the setting of thermosetting resin or the softening of the thermoplastic resin. FIGURE 2 shows that, during compressive heating, a typical fibrous organic material, sawdust, or the product, when containing a thermoplastic binder, undergoes a rapid decline in volume with a small temperature change. This rapid volume decrease appears to occur as a result of an interaction between the binder and the fibrous organic material. In effect the binder appears to soften the fibrous organic material and thus facilitates the compression. This is similar to the effect of added moisture as will be seen later.

Figure 3:
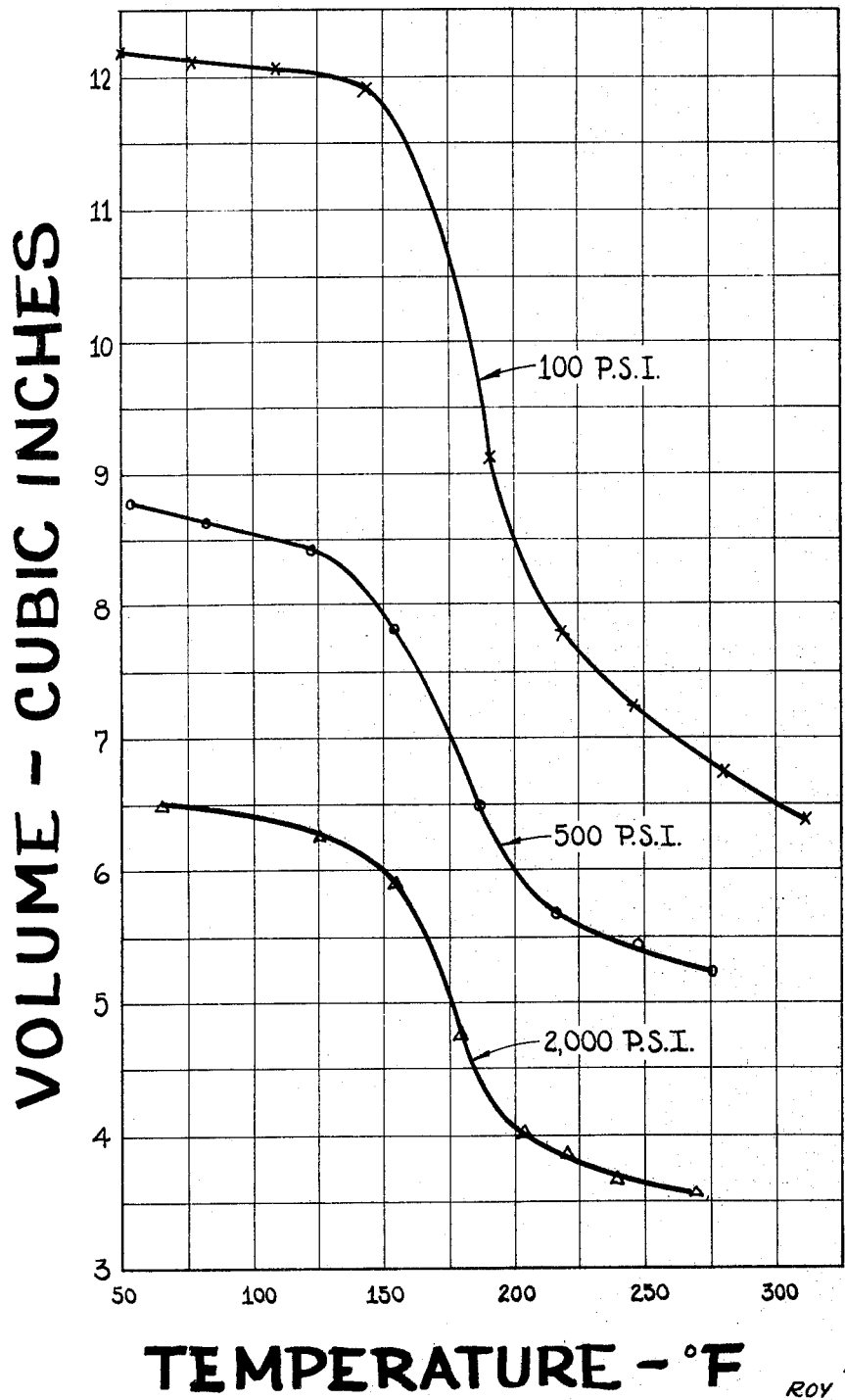

As would be expected, the volume of the product at any temperature varies inversely with the pressure applied. This relationship is shown in FIGURE 3. It is evident from this figure that a wide range of porosities can be achieved by variations of the pressure and temperature.

The upper temperature limit is determined by the decomposability of the product components. For example, commercial granular fertilizers begin to decompose when heated much above 250° F., though their decomposition is expected to be less severe under the low oxygen availability occurring during the formation of this product. Normally it appears that cooling of the compressed product would be desirable before the applied pressure is released in order to achieve a high level of cohesion while still under pressure.

The length of time under pressure also has a small effect on the compressibility of the product, though this seems largely due to the slowness of penetration of heat into the interior of the product. If this is so, a partial preheating of the mixture would reduce this problem.

Figure 4:
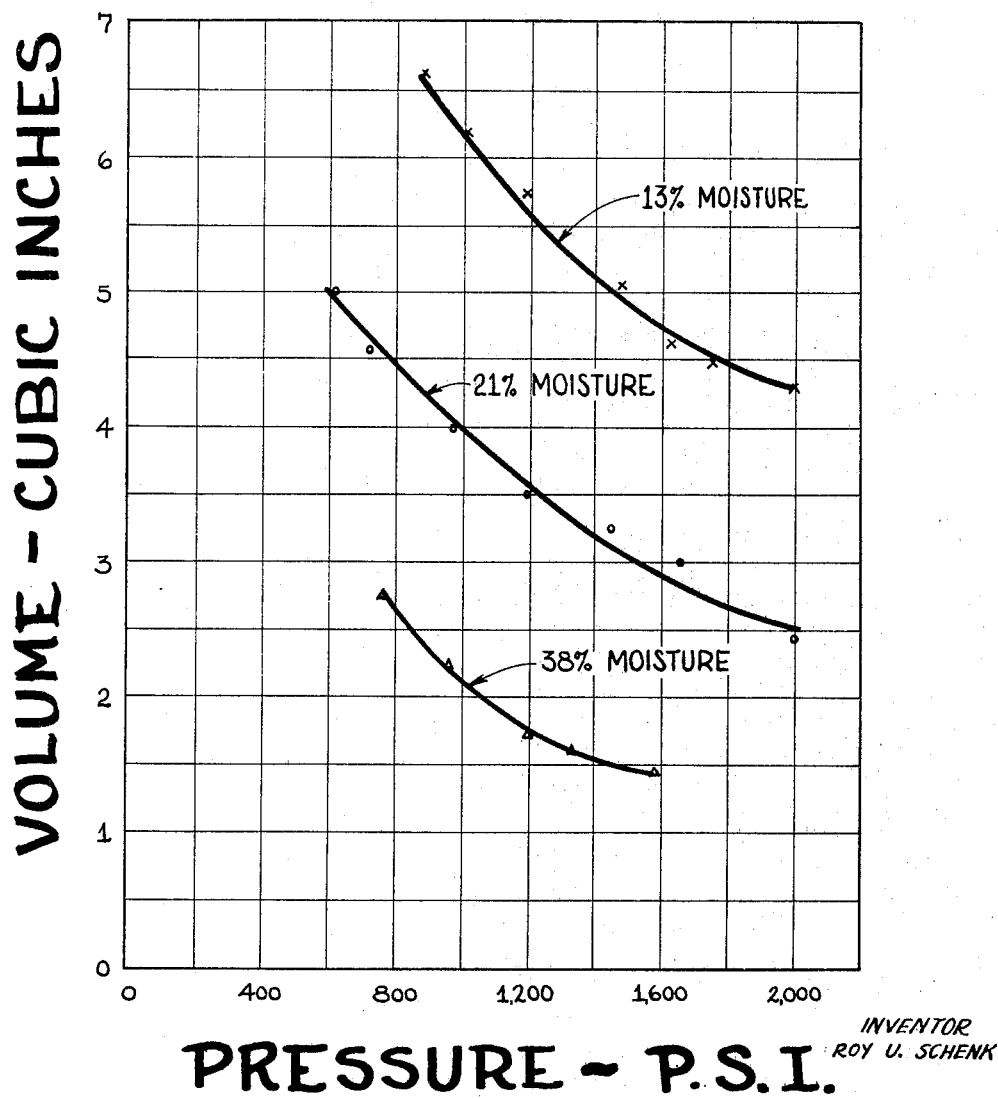
FIGURE 4 is a graph showing the effects of variations of moisture content on the volume and thus on the porosity of equal dry matter weights of the fibrous organic material peat moss when compressed at increasing pressures and at ambient temperature, about 55° F.

The moisture content of the fibrous organic material and of the mixture is of considerable importance. Thus FIGURE 4 shows the great increase in compressibility which is attained by increased moisture content of the fibrous organic material peat moss. This increased compressibility with added moisture was also observable in sawdust and in the complete mixtures at all pressures, particularly at lower temperatures. Thus a limited addition of moisture could yield increased compressibility and thus reduced porosity at lower binding temperatures if this should be necessary for readily decomposable materials. With the usual components, however, this moisture induced increase in compressibility would largely be sacrificed in order to avoid moisture and associated fertilizer nutrient losses both during and following compression; and also to attain a higher level of cohesive strength during the binding operation. With a thermoplastic binder under any temperature and pressure at which it interacts with the fibrous organic material, a great increase in compressibility is attained without the addition of water.

The use of an oven dried fibrous organic material likewise resulted in a product with very desirable properties. The product volume was little different than when air dry fibrous organic material was used. In contrast, when 5 grams of water was thoroughly admixed in 35 grams of air dry sawdust and this was combined with 10 grams of Cumar V-3 resin and 55 grams of granular fertilizer, 6 grams of moisture and fertilizer nutrients were lost during compression at 2,000 p.s.i. and heating 194° F. conditions which gave a product having the same volume as the same mixture without added water when heated to 252° F. at 2,000 p.s.i. Furthermore, the higher moisture product broke readily when removed from the press, which indicates inadequate binding and cohesiveness. It also developed cracks along its sides which would negate any attempt at controlled release; and in addition the rod warped and distorted after the pressure was released, yielding an unsightly product. In contrast the product prepared from the air dried or oven dried fibrous organic material was solid and very strong, indicating a very high level of cohesiveness.

It is difficult to precisely spell out the useable moisture ranges of the fibrous organic material since the moisture content and moisture absorptive capacities of the binder and of the fertilizing materials may vary widely. Likewise the ratios of the components may vary substantially, and the moisture absorptive capacities of fibrous organic materials vary widely. Thus air dry sawdust used in these studies contained seven percent moisture whereas air dry peat moss under the same conditions contained 13 percent moisture. However, it is necessary for the moisture content of the fibrous organic material and of the composite as a whole to be low enough to permit thorough and even bonding during compression so as to yield a product with high cohesion. A low moisture content is also desirable to prevent the loss of significant amounts of moisture which contain fertilizer nutrients.

Thus, in the example cited above, 19 percent moisture in the sawdust was found to be excessive; whereas peat moss containing 21 percent moisture had relatively high cohesive strength after compressive heating. However, it does seem reasonable to anticipate that, when even the most absorptive fibrous organic materials constitutes about one-third of the composite weight, a moisture content much above 25 percent will on compression yield a product lacking the cohesiveness desired in this product. Actually moisture contents in the range of 0 to 15 percent appear to be more useful for most applications, and even here the higher limit will likely be less with fibrous organic materials having low moisture capacities. The moisture content would undoubtedly need to be even lower if the binder or the fertilizing component were to contain a significant amount of available moisture.

To further illustrate the preperation of this product, the following additional examples are given:

A mixture of 58 percent granular fertilizer, 35 percent air dry sawdust and 7 percent of a catalyzed urea-formaldehyde resin containing 18 percent moisture was compressed for 10 minutes at 8,000 p.s.i. and a temperature of 300° F. A product of very high strength and low porosity was obtained, though a slight amount of moisture and nutrient loss was observed.

As another example, a mixture of 20 percent Cumar V-3 resin, 40 percent air dust sawdust and 40 percent granular fertilizer was compressed at a pressure of 100 p.s.i. and a temperature of 312° F. A structurally firm but rather porous product was obtained.

As a third example, a mixture of three percent Cumar V-3 resin, 10 percent air dry peat moss and 87 percent fertilizer was compressed to 2,000 p.s.i. and heated to 246° F. The product was remarkably strong structurally, but would doubtlessly solubilize very rapidly in the soil. Thus this appears to be as high a fertilizer concentration as would be practical for any immediately evident usage.

As a further example, a mixture containing 10 percent Eastobond M-2 resin, 35 percent air dry peat moss and 55 percent granular fertilizer was compressed at 2000 p.s.i. and 220° F. This mixture exhibited an unusually low volume at this temperature, evidently due to the lower softening point of this binder (206° F.). Thus it compressed more than did a comparable mixture in which the binder was Cumar V-3 resin, even though the latter was heated to 250° F. The softening range of the Cumar resin is reported by the producer to be 228–243° F.

Actually, as is evident in FIGURES 2 and 3, the bulk of the volume decreases during compression occurs at temperatures considerably below the reported softening points of the binders. This is not unexpected, however, since softening points are normally measured under ambient pressure conditions, and flow would be expected to increase at higher pressure, even as rocks are known to flow if exposed to high enough pressures.

Figure 5:
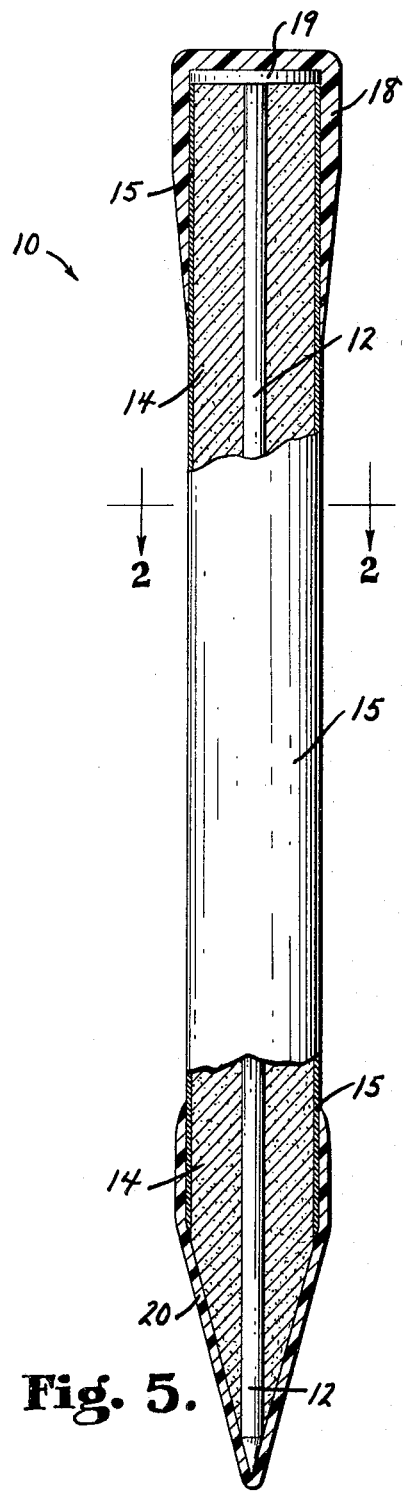
FIGURE 5 is a longitudinal sectional view, partly in elevation, of a fertilizer stake which is a preferred embodyment of the present invention.
Figure 6:
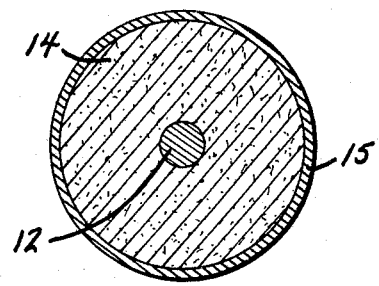
FIGURE 6 is a horizontal sectional view of the stake of FIGURE 5 and taken along the line 2—2 of FIGURE 5.
Figure 7:
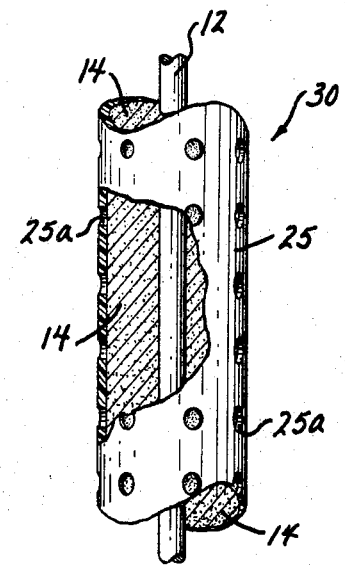
FIGURE 7 is a fragmentary longitudinal sectional view, partly in elevation, of a portion of a stake in another form.

In a preferred embodiment, this product takes the form of a stake having sufficient strength to permit it to be driven into the ground. Since attempts may be made to drive this stake into dry or very hard ground, various supplemental features may be added to improve its driving capabilities. FIGURES 5, 6 and 7 show a stake 10 containing such supplemental features. The stake 10 includes a substantially rigid core 12, which is preferably solid and is formed of a suitable material such as wood, metal or the like, for example. This may extend all or a substantial portion of the length of the rod, starting from the driving end. The stake could have a cross section other than round, for example square, rectangular triangular, etc.

The mixture 14 of fertilizing material, fibrous organic material and binder is bonded to the core 12.

An external covering or shell 15 may surround the cylindrical portion of the mixture 14 and may be bonded thereto. The covering or shell 15 may be composed of decomposable material such as paper wood or plastic, for example, and may serve as a support for the mixture 14 and for decorative purposes.

A disk 19 may be disposed in contact with the upper or driving end of the mixture 14 and the rod 12 for absorbing the driving impact when the stake 10 is driven into the ground. The disc 19 is formed of a suitable impact absorbing material such as wood or metal, for example.

A covering or coating 18 may fit over the disc 19 and surround a portion of the external covering or shell 15. The covering or coating 18, which also serves to absorb the driving impact along with the disc 19, is formed of a suitable impact absorbing material such as plastic imbedded cloth or metal for example.

The pointed portion of the mixture 14 may have a cover or coating 20, which covers the tapered portion and also may extend around the adjacent portion of the external covering or shell 15. The cover or coating 20 is composed of an abrasion resistant and preferably slippery material to facilitate driving and to prevent abrasive damage to the driving point.

An advantage of this invention is that it eliminates the "burning" of plants due to nitrogen and potash salts in the fertilizing material. Another advantage of this invention is that it prevents the waste of fertilizing material. A further advantage of this invention is that it controls the rate of release of the fertilizing material and provides a method for varying in a controlled fashion the rate of nutrient release in a more effective manner than heretofore attainable. Still another advantage of this invention is that it is relatively inexpensive to make.

What is claimed is:
1. A method of forming a fertilizer product for prolonged fertilization of plants and having a reduced rate of fertilizer nutrient release, said method comprising the mixing of an essentially dry fibrous organic material, an essentially dry fertilizing material and a bonding agent which binds the composite into a rigid mass by the application of heat and pressure said composite containing at least 10% of fibrous organic material, at least 3% of binder, and the balance essentially fertilizer materials and bonding this composite into a rigid unitary mass with a high level of cohesion by the application of 100 to 8000 p.s.i. of pressure while heating to a temperature between ambient and 380° F., said temperature and pressure being interdependent on the binding agent used to bind the composite into a rigid, unitary mass.

2. The method of claim 1 where the composite is compressed and heated in a mold to produce the shape of a stake.

3. The method of claim 2 including the step of compressing the composite around a supportive rod which is essentially centered longitudinally through at least a substantial portion of the length of said stake to bond the composite to the supportive rod.

4. The method of claim 2 including the step of placing a protective exterior covering on the longitudinal end portions of said stake.

5. The method of claim 1 including the step of covering at least a substantial portion of the external surfaces of the compressed composite with a layer of essentially water impervious substance.

6. The method of claim 1 where the binder and the fibrous organic materials are the same substance.

7. The method of claim 1 where the fibrous organic material comprises 10–50 percent, the fertilizer comprises 40–60 percent, and the binder comprises essentially the balance of the composite weight and the pressure applied varies between 500 and 2,000 p.s.i. and the temperature does not exceed 300° F.

References Cited

UNITED STATES PATENTS

| | | | |
|---|---|---|---|
| 2,032,608 | 3/1936 | Antrim | 71—64 |
| 3,003,911 | 10/1961 | Lindstrom et al. | 71—64 |

ARTHUR D. KELLOGG, Primary Examiner

R. D. BAJAFSKY, Assistant Examiner

U.S. Cl. X.R.

71—24; 47—48.5